No. 864,488. PATENTED AUG. 27, 1907.
J. M. H. RENSON.
SIGNALING APPARATUS FOR TRAMWAYS.
APPLICATION FILED NOV. 14, 1906.
2 SHEETS—SHEET 1.
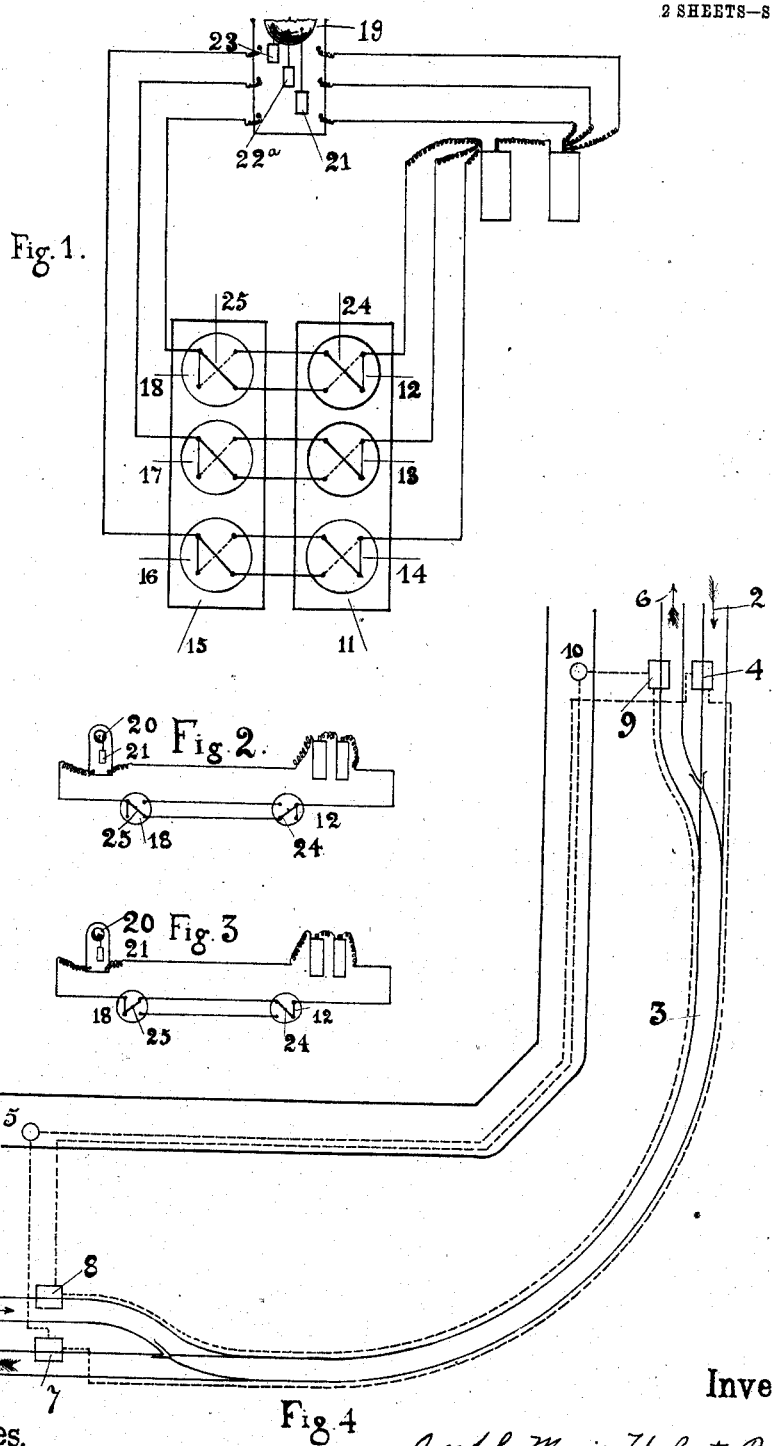
Witnesses.
Jesse N. Lutton.
R. W. Sommers
Inventor.
Joseph Marie Hubert Renson
by Henry Orth Jr.
Atty.

No. 864,488. PATENTED AUG. 27, 1907.
J. M. H. RENSON.
SIGNALING APPARATUS FOR TRAMWAYS.
APPLICATION FILED NOV. 14, 1906.
2 SHEETS—SHEET 2.
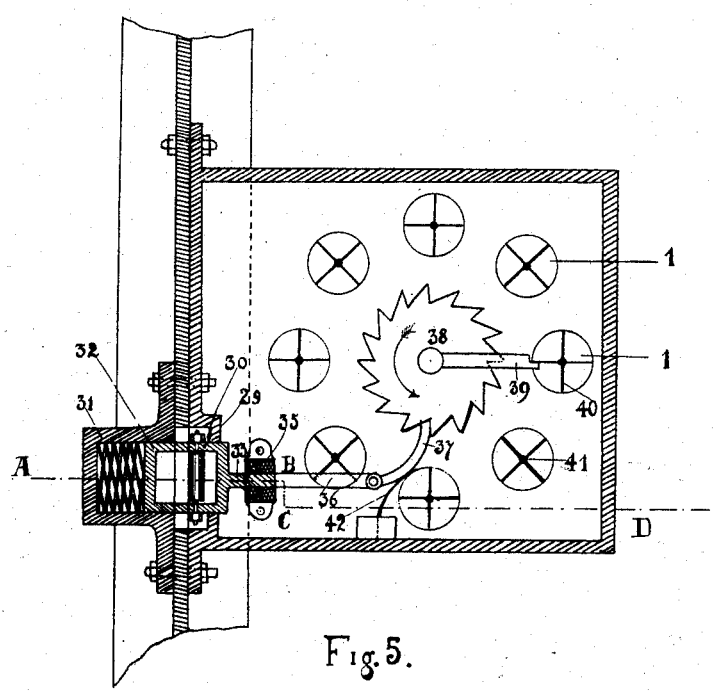
Fig. 5.
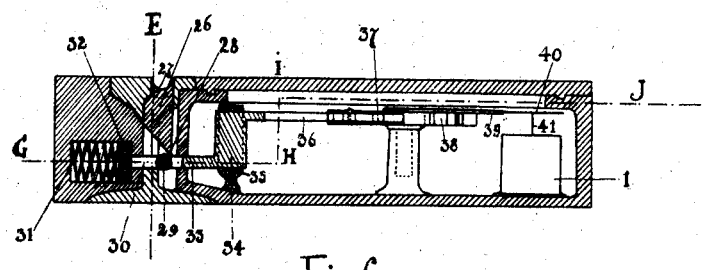
Fig. 6.
Fig. 7.
Witnesses.
Jesse N. Lutton
C. W. Sommers
Inventor.
Joseph Marie Hubert Renson
by Henry Otto Jr.
Atty.

UNITED STATES PATENT OFFICE.

JOSEPH MARIE HUBERT RENSON, OF LIEGE, BELGIUM.

SIGNALING APPARATUS FOR TRAMWAYS.

No. 864,488.          Specification of Letters Patent.          Patented Aug. 27, 1907.

Application filed November 14, 1906. Serial No. 343,447.

*To all whom it may concern:*

Be it known that I, JOSEPH MARIE HUBERT RENSON, a subject of the King of Belgium, residing in Liege, 19 Rue Ausiaux, in the Kingdom of Belgium, have invented certain new and useful Improvements in Signaling Apparatus for Tramways; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to an improved method of signaling at dangerous points on tramway lines.

It is specially devised to prevent collisions upon a single line upon which two double lines converge from both sides.

It comprises for each direction of travel two boxes placed upon the track a little before the junctions with the single track. Each of these boxes contains a mechanism actuating electrically a signal whenever a vehicle is passing on to the single line and reverses the signal when it has quitted the said line.

Figure 1 illustrates diagrammatically the electric connections of an apparatus devised for the successive passage of three vehicles in the same direction. Figs. 2 and 3 show two diagrams of the electric connections in one of the series of commutators effected by the apparatus on the passage of a vehicle. Fig. 4 shows a plan of the installation of the apparatus in a particular case. Fig. 5 is a horizontal section of the apparatus, the electric wires being supposed to be removed. This section is made on the line G—H—I—J of Fig. 6. Fig. 6 is a vertical section on the line A—B—C—D of Fig. 5. To render this figure more clear only one commutator 1 is indicated. Fig. 7 is a partial section on the line E—F of Fig. 6.

In the case of the position represented in Fig. 4, a little before a vehicle moving in the direction of the arrow 2 arrives upon the single track, it actuates the mechanism of the box 4 which has the effect of closing the signal 5 and warning vehicles traveling in the direction of the arrow 6 that they cannot pass upon the single track. The signal 5 remains closed as long as the first vehicle has not passed upon the second box 7. Nevertheless if a second vehicle arrives following the direction of the arrow 2 before the first vehicle has passed this box 7 it acts equally upon the box 4 and the signal 5 will be maintained closed as long as this second vehicle has not passed over the box 7, even when this latter has already been passed by the first vehicle. The boxes 8 and 9 of the signal 10 operate in like manner for vehicles traveling in the direction of the arrow 6.

The apparatus may be combined to maintain if desirable the signal closed during the successive passage of a fixed number of vehicles in the same direction; the figure 1 representing the connections in the case of a combined apparatus for three successive passages. The entrance box 11 (corresponding to the box 4 shown in Fig. 4) contains three commutators for two directions 12, 13 and 14. The exit box 15 (corresponding to the box 7 in the case of Fig. 4) comprises likewise three commutators 16, 17 and 18. The signal 19 (corresponding to the signal 5 in the case of Fig. 4) comprises a single stamp 20 struck by the hammers 21, 22$^a$, 23 respectively actuated by the current traversing one of the pairs of boxes 12—18, 13—17 or 14—16. The first vehicle which passes over the box 11 (box 4 in Fig. 4) causes the key 24 of the commutator 12 to turn and brings it into the position shown in Fig. 2. It will be seen that the movement has the effect of closing the circuit and of actuating the hammer 21. When the vehicle has passed over the box 15 (box 7 of Fig. 4) it will cause the key 25 of the commutator 18 to turn and bring it into the position shown in Fig. 3. The key 24 being left in the position represented in Fig. 2 it is obvious that the circuit of this group of commutators is opened and that the hammer 21 ceases to be actuated. The same circuit will be again closed as shown in Fig. 3, when a fourth vehicle or the first of the next series of three cars has arrived to bring the key 24 into the position shown in this figure. The passage of two consecutive vehicles will operate in like manner consecutively the groups of commutators 13—17 and 14—16. In order to obtain this successive control of the commutators each of the four boxes placed at the entrance to the single track is arranged as shown in the Figs. 5, 6 and 7. In one of the rails of the track there is formed an opening in which there is a block 26. This block is provided at its upper part with a convex portion 27, placed in the rail and at its lower part it is arranged at an angle 28 resting upon a roller 29. This roller 29 is supported by a fork 30 which a spring 31 pushes constantly to the right. This fork is guided on the one hand by a rectangular plate 32 which displaces itself in the spring box, and on the other hand by a solid bar 33 of a slide 34 which moves in a support 35. At the upper part of this slide 34 is fixed a rod 36, at the end of which is pivoted a piece 37 which is continually pressing by means of a spring 42 against a ratchet wheel 38. Upon this wheel 38 is fixed an arm 39, the end of which acts on the rotation of the wheel 38 upon the arm 40 fixed at the end of the controlling axis 41 of the commutators 1. These arms 40 are arranged crosswise, so that each time that the arm 39 actuates one of them the key of the corresponding commutator turns a quarter of a turn.

Upon the passage of the first wheel of a car, the block 26 is pushed down, and by means of the roller 29 pushes the fork and consequently the ratchet 37 towards the left; as soon as the wheel of the vehicle has passed, all these pieces under the influence of the spring 31 resume their original position, which has for result to cause the wheel 38 to turn one division in the direction of the arrow. The passage of the second wheel of the same vehicle makes this wheel 38 turn a second division. The fraction of a turn of which the passage of a car thus causes the wheel 38 to make, has further for its effect to cause to turn by a quarter of a revolution the key of one of the commutators. The passage upon the same box of a following vehicle will likewise cause the fork of the following commutator to turn by a quarter of a turn, and so forth, provided the vehicle has but four wheels, two of which, i. e. the wheels on one side of the car actuate the block 27.

It is obvious that the signal itself can be of any desired kind. In place of a bell it may be formed for example of lamps or movable disks of a system of any kind actuated by electricity. The necessary current for the operation of the apparatus instead of being supplied as represented in the drawings by batteries, may be taken from the line.

Having now particularly described and ascertained the nature of my said invention and in what manner the same is to be performed, I declare that what I claim is:

1. Signaling apparatus for tramways, comprising two boxes placed upon one of the rails at the entrance and at the exit from the dangerous section, each of these boxes containing as many commutators for two directions as there can be admitted successively vehicles upon the said dangerous section; each commutator of one of the boxes being united electrically to the commutator of the other box in such a manner that a circuit comprising a signal may be closed as soon as one vehicle passes over the first box and opened as soon as it passes over the second; the various commutators of each of the boxes being successively actuated mechanically by the passage of the vehicle over the said box.

2. Apparatus for signaling for tramways, comprising two boxes placed at rails at the entrance and the exit of the dangerous section, each of said boxes containing as many commutators for the two directions as there are cars to be permitted on the section, each commutator of one of said boxes electrically connected to a commutator of the other box, a circuit containing a signal closed by the commutators of one box and opened by the commutators of the second box when a vehicle passes over the boxes, means operated by the vehicle to mechanically and successively control the commutators, said means comprising an arm movable into contact with the commutators of a box, a ratchet wheel secured to the arm, a reciprocable arm to actuate the ratchet wheel, and a spring to retain said reciprocable arm in normal position.

3. Apparatus for signaling for tramways, a rail having a movable member therein, a spring retracted element moved by said member when a wheel passes over the same, a ratchet wheel and an arm secured thereto operated by the spring retracted element, a plurality of commutators and actuating arms thereon in the path of the afore mentioned arm, whereby said commutators will operate mechanically in succession, and a signal at a distant point electrically connected to said commutators.

In testimony that I claim the foregoing as my invention, I have signed my name in presence of two subscribing witnesses.

JOSEPH MARIE HUBERT RENSON.

Witnesses:
　MAURICE BENOIT,
　LEÓNARD LÉVA.